(12) United States Patent
Hall et al.

(10) Patent No.: US 6,340,195 B1
(45) Date of Patent: Jan. 22, 2002

(54) TRUCKBOX COVER AND SIDEWALL EXTENSION ATTACHMENT

(76) Inventors: Arizona Hall, 4486 San Fransico St., St Louis, MO (US) 63115; John Henry Hall, 1937 Madison St. P.O. Box 1498, Gary, IN (US) 46407

( * ) Notice: Subject to any disclaimer, the term of this patent is extended or adjusted under 35 U.S.C. 154(b) by 0 days.

(21) Appl. No.: 09/383,669

(22) Filed: Aug. 26, 1999

(51) Int. Cl.⁷ .................................................. B60P 7/02
(52) U.S. Cl. ..................................... 296/100.07; 296/13
(58) Field of Search .................... 296/13, 14, 26.04, 296/26.06, 100.06, 100.07, 32, 36

(56) References Cited

U.S. PATENT DOCUMENTS

| | | | | |
|---|---|---|---|---|
| 2,224,126 A | * | 12/1940 | Eilert ........................... | 296/13 |
| 2,997,330 A | * | 8/1961 | Boultinghouse ............... | 296/3 |
| 3,069,199 A | * | 12/1962 | Reardon et al. ........ | 296/100.07 |
| 3,765,717 A | * | 10/1973 | Garvert ................ | 296/100.07 |
| 3,782,776 A | * | 1/1974 | Ormont ................ | 296/216.02 |
| 3,995,890 A | * | 12/1976 | Fletcher ........................ | 296/10 |
| 4,261,611 A | * | 4/1981 | Barry et al. ............. | 296/100.1 |
| 4,531,775 A | * | 7/1985 | Beals ..................... | 296/100.06 |
| 4,695,087 A | * | 9/1987 | Hollrock ..................... | 296/14 |
| 4,943,108 A | * | 7/1990 | Turnbull ................ | 296/100.07 |
| 5,009,457 A | * | 4/1991 | Hall .............................. | 296/3 |
| 5,013,078 A | * | 5/1991 | Eckerd et al. ........ | 296/100.07 |
| 5,110,021 A | * | 5/1992 | Dawson, Jr. ................ | 224/405 |
| 5,183,309 A | * | 2/1993 | Jordan .................. | 296/100.07 |
| 5,209,543 A | * | 5/1993 | Harkins, Jr. ............. | 296/26.06 |

* cited by examiner

*Primary Examiner*—Stephen T. Gordon
*Assistant Examiner*—Patricia Engle

(57) ABSTRACT

A truckbox cover and sidewall extension attachment for accomplishing two tasks of not only covering the truckbox when needed but also extending the sides of the truckbox when needed. The truckbox cover and sidewall extension attachment includes a first and second wall members dimensioned to cover the box of a pickup truck, and further includes a flange or flap member extending along the length and from a longitudinal edge of the first wall member, and also includes a first telescoping brace member connected to the truckbox and to the first wall member, and a second telescoping brace member connected to the truckbox and to the second wall member. The first wall member is hingedly attached to a first side wall of the box of the pickup truck, and the second wall member is hingedly attached to a second side wall of the box of the pickup truck with a lockable latch member being disposed in the second wall member and having a latch portion capable of engaging the flap member to securely lock the two wall members upon the box of the pickup truck.

1 Claim, 4 Drawing Sheets

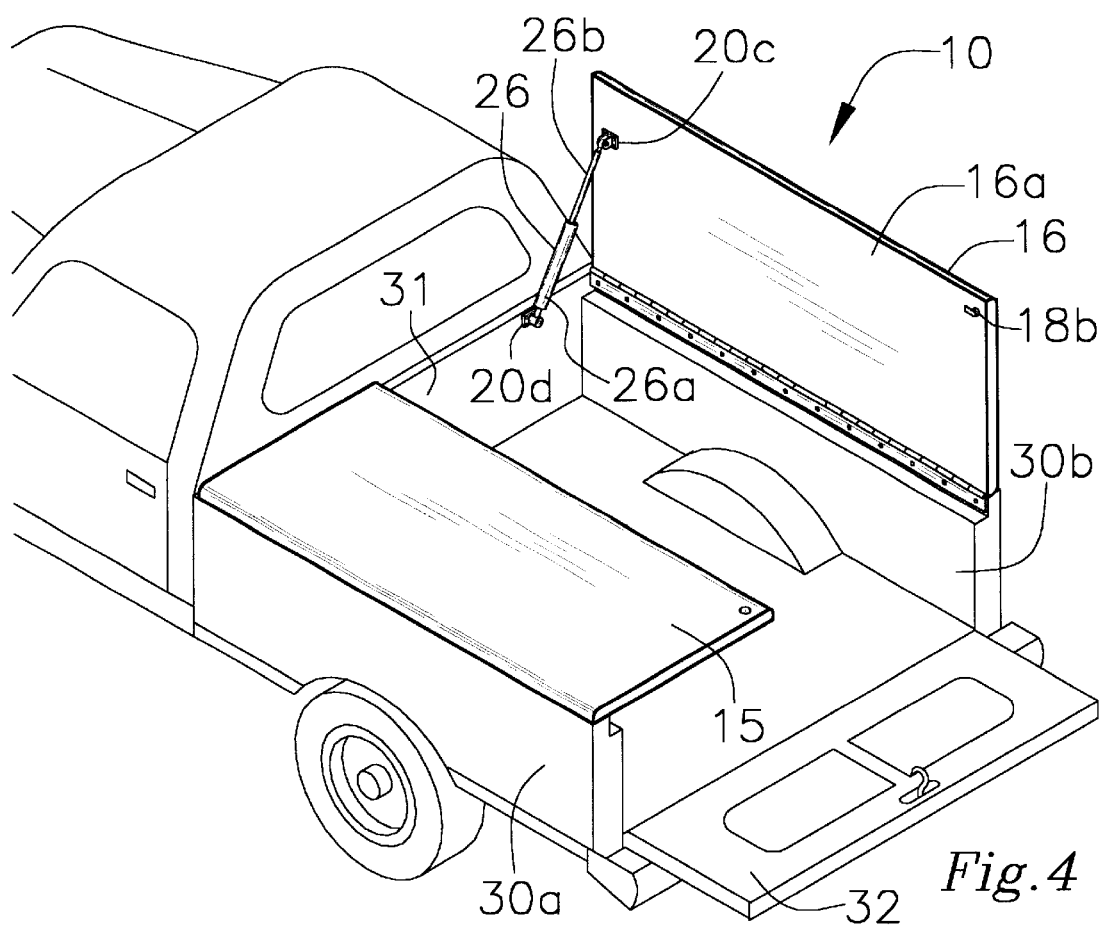

TRUCKBOX COVER AND SIDEWALL EXTENSION ATTACHMENT

BACKGROUND OF THE INVENTION

1. Field of the Invention

The present invention relates to a cover and sidewall extensions for pickup truckboxes and more particularly pertains to a new truckbox cover and sidewall extension attachment for accomplishing two tasks of not only covering the truckbox when needed but also extending the sides of the truckbox when needed.

2. Description of the Prior Art

The use of a cover and sidewall extensions for pickup truckboxes is known in the prior art. More specifically, a cover and sidewall extensions for pickup truckboxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,199,188; 5,340,188; 4,746,161; D327,668; 4,003,596; and 5,755,480.

While these devices fulfill their respective, particular objectives and requirements, the aforementioned patents do not disclose a new truckbox cover and sidewall extension attachment. The inventive device includes a first and second wall members dimensioned to cover the box of a pickup truck, and further includes a flange or flap member extending along the length and from a longitudinal edge of the first wall member, and also includes a first telescoping brace member connected to the truckbox and to the first wall member, and a second telescoping brace member connected to the truckbox and to the second wall member. The first wall member is hingedly attached to a first side wall of the box of the pickup truck, and the second wall member is hingedly attached to a second side wall of the box of the pickup truck with a lockable latch member being disposed in the second wall member and having a latch portion capable of engaging the flap member to securely lock the two wall members upon the box of the pickup truck.

In these respects, the truckbox cover and sidewall extension attachment according to the present invention substantially departs from the conventional concepts and designs of the prior art, and in so doing provides an apparatus primarily developed for the purpose of for accomplishing two tasks of not only covering the truckbox when needed but also extending the sides of the truckbox when needed.

SUMMARY OF THE INVENTION

In view of the foregoing disadvantages inherent in the known types of a cover and sidewall extensions for pickup truckboxes now present in the prior art, the present invention provides a new truckbox cover and sidewall extension attachment construction wherein the same can be utilized for accomplishing two tasks of not only covering the truckbox when needed but also extending the sides of the truckbox when needed.

The general purpose of the present invention, which will be described subsequently in greater detail, is to provide a new truckbox cover and sidewall extension attachment which has many of the advantages of a cover and sidewall extensions for pickup truckboxes mentioned heretofore and many novel features that result in a new truckbox cover and sidewall extension attachment which is not anticipated, rendered obvious, suggested, or even implied by any of the prior art a cover and sidewall extensions for pickup truckboxes, either alone or in any combination thereof.

To attain this, the present invention generally comprises a first and second wall members dimensioned to cover the box of a pickup truck, and further includes a flange or flap member extending along the length and from a longitudinal edge of the first wall member, and also includes a first telescoping brace member connected to the truckbox and to the first wall member, and a second telescoping brace member connected to the truckbox and to the second wall member. The first wall member is hingedly attached to a first side wall of the box of the pickup truck, and the second wall member is hingedly attached to a second side wall of the box of the pickup truck with a lockable latch member being disposed in the second wall member and having a latch portion capable of engaging the flap member to securely lock the two wall members upon the box of the pickup truck.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new truckbox cover and sidewall extension attachment which has many of the advantages of a cover and sidewall extensions for pickup truckboxes mentioned heretofore and many novel features that result in a new truckbox cover and sidewall extension attachment which is not anticipated, rendered obvious, suggested, or even implied by any of the prior art a cover and sidewall extensions for pickup truckboxes, either alone or in any combination thereof.

It is another object of the present invention to provide a new truckbox cover and sidewall extension attachment which may be easily and efficiently manufactured and marketed.

It is a further object of the present invention to provide a new truckbox cover and sidewall extension attachment which is of a durable and reliable construction.

An even further object of the present invention is to provide a new truckbox cover and sidewall extension attachment which is susceptible of a low cost of manufacture with regard to both materials and labor, and which accordingly is then susceptible of low prices of sale to the consuming public, thereby making such truckbox cover and sidewall extension attachment economically available to the buying public.

Still yet another object of the present invention is to provide a new truckbox cover and sidewall extension attachment which provides in the apparatuses and methods of the prior art some of the advantages thereof, while simultaneously overcoming some of the disadvantages normally associated therewith.

Still another object of the present invention is to provide a new truckbox cover and sidewall extension attachment for accomplishing two tasks of not only covering the truckbox when needed but also extending the sides of the truckbox when needed.

Yet another object of the present invention is to provide a new truckbox cover and sidewall extension attachment which includes a first and second wall members dimensioned to cover the box of a pickup truck, and further includes a flange or flap member extending along the length and from a longitudinal edge of the first wall member, and also includes a first telescoping brace member connected to the truckbox and to the first wall member, and a second telescoping brace member connected to the truckbox and to the second wall member. The first wall member is hingedly attached to a first side wall of the box of the pickup truck, and the second wall member is hingedly attached to a second side wall of the box of the pickup truck with a lockable latch member being disposed in the second wall member and having a latch portion capable of engaging the flap member to securely lock the two wall members upon the box of the pickup truck.

Still yet another object of the present invention is to provide a new truckbox cover and sidewall extension attachment that conveniently allows the user to cover the truckbox when needed and to extend the sides of the truckbox when needed.

Even still another object of the present invention is to provide a new truckbox cover and sidewall extension attachment that eliminates getting different elements for the tasks of extending the side walls or cover the box of the pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a detailed perspective view one of the telescoping brace members of the present invention.

FIG. 4 is a perspective view of the present invention mounted to a pickup truck box.

DESCRIPTION OF THE PREFERRED EMBODIMENT

Figure 1:
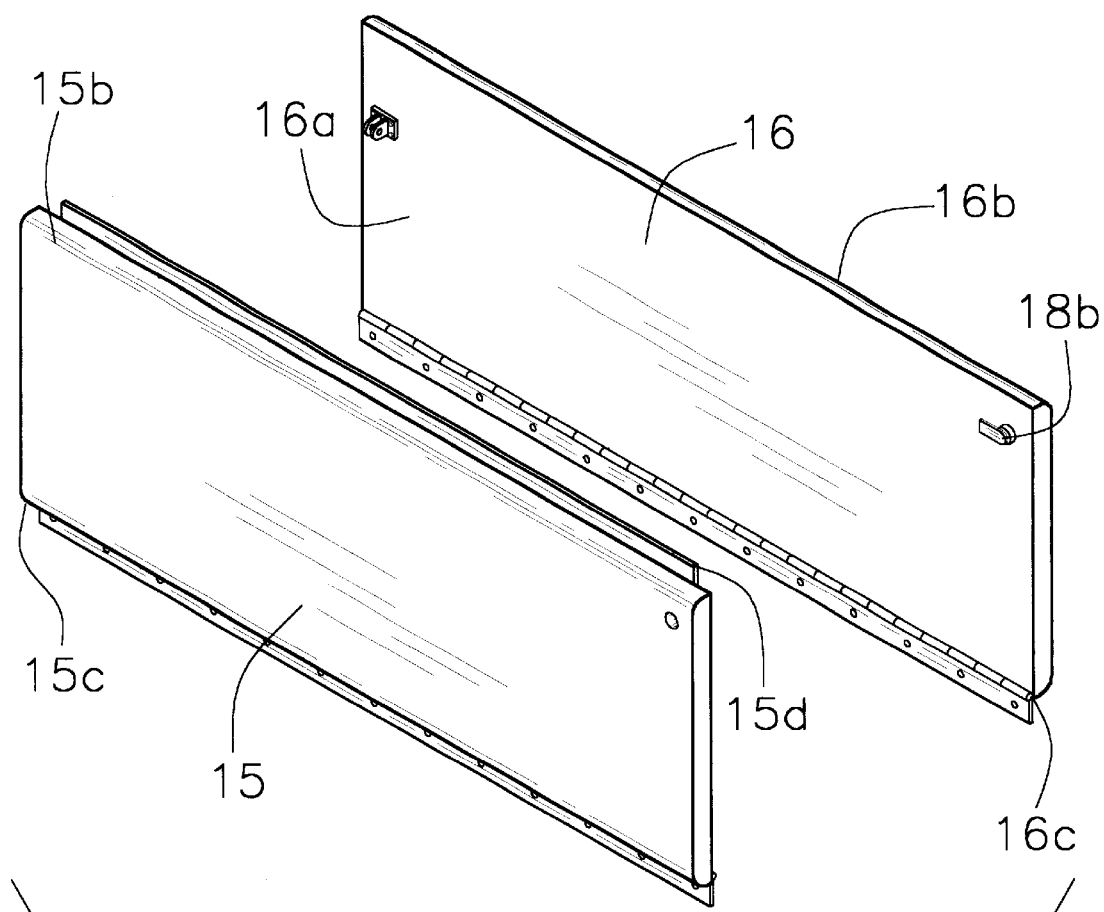
FIG. 1 is a perspective view of a new truckbox cover and sidewall extension attachment according to the present invention with a substantially continuous hinge structure.
Figure 2:
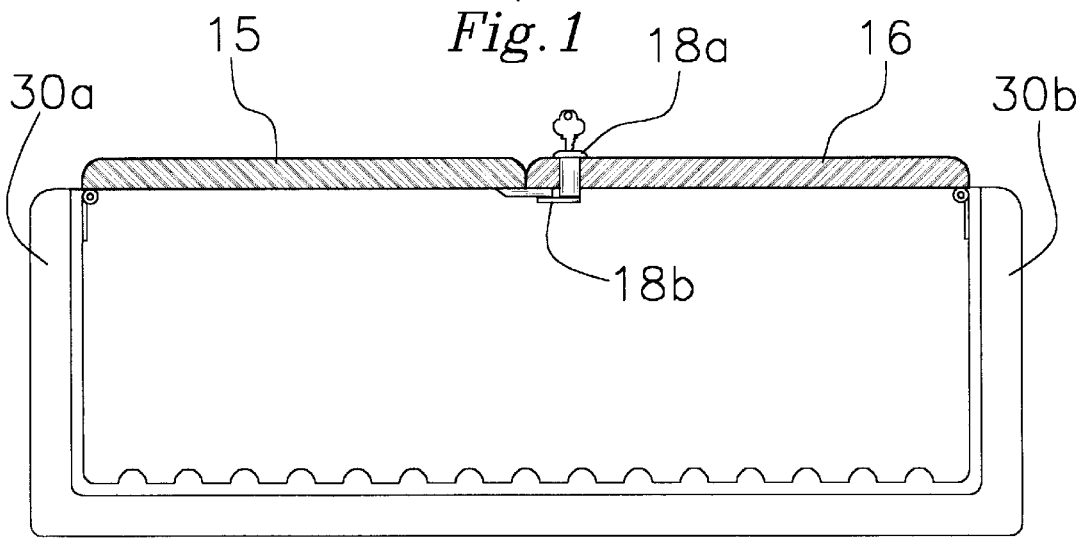
FIG. 2 is a side elevational view of the present invention.
Figure 5:
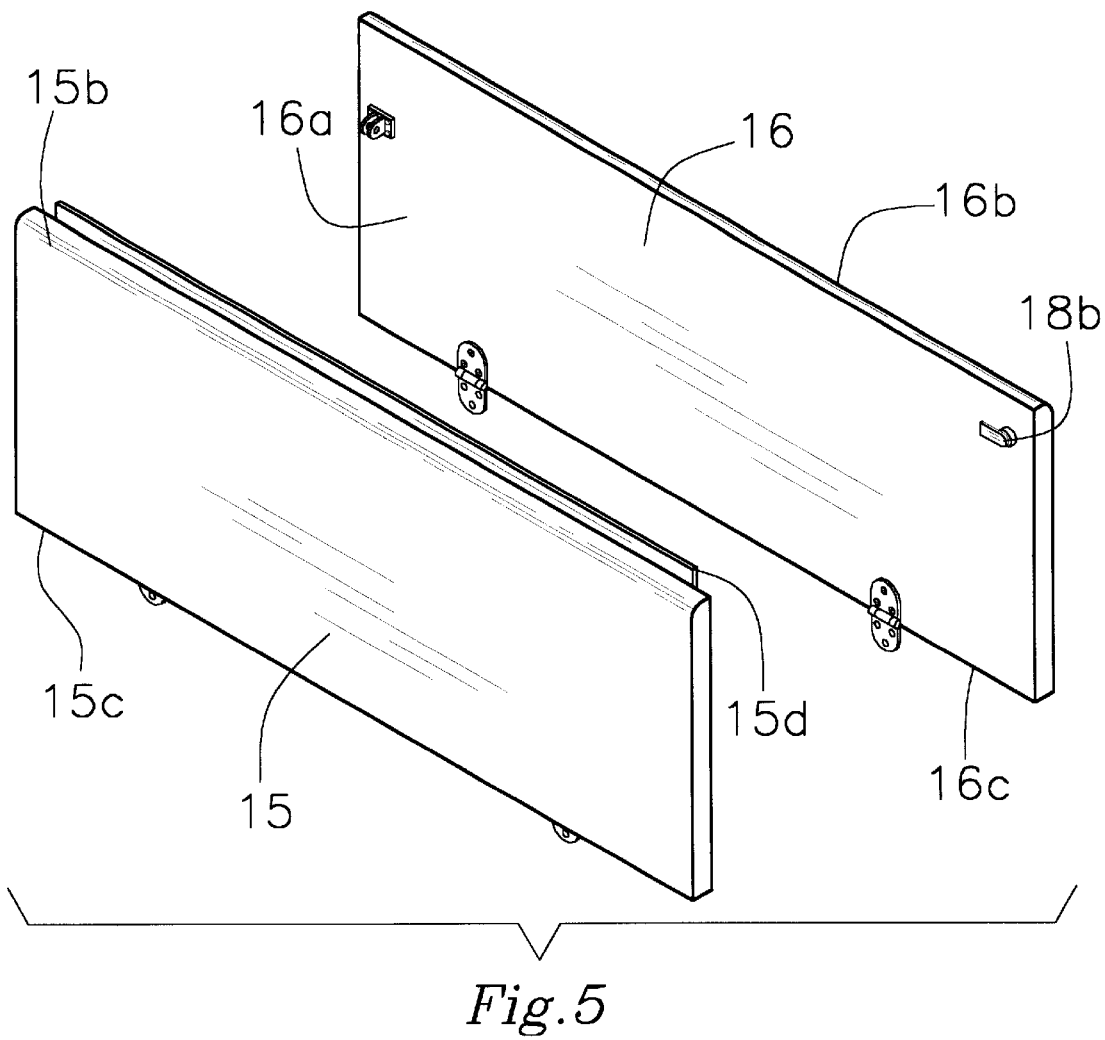
FIG. 5 is a perspective view of a second embodiment of the present invention.
Figure 6:
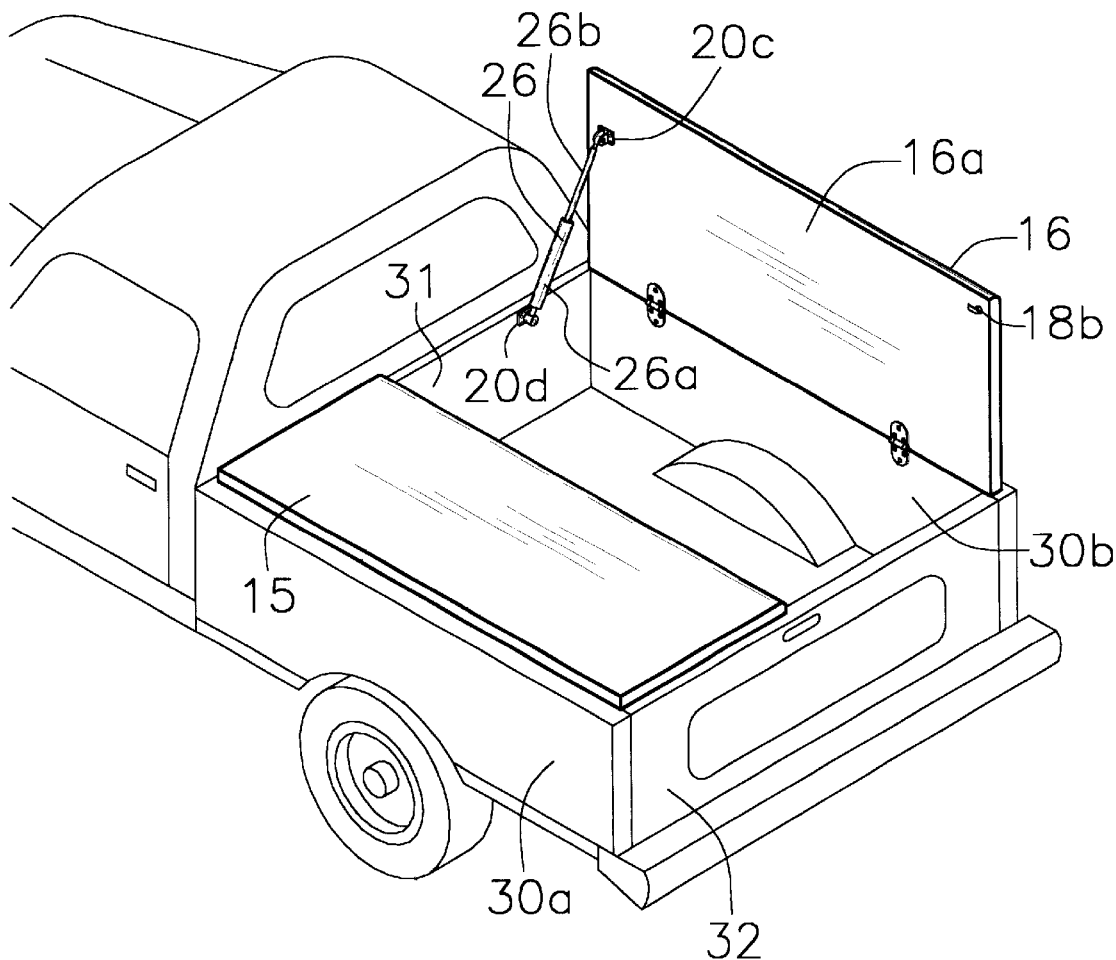
FIG. 6 is a perspective view of the second embodiment of the present invention mounted to a pickup truck box with spaced hinge structures.

With reference now to the drawings, and in particular to FIGS. 1 through 6 thereof, a new truckbox cover and sidewall extension attachment embodying the principles and concepts of the present invention and generally designated by the reference numeral 10 will be described.

As best illustrated in FIGS. 1 through 6, the truckbox cover and sidewall extension attachment 10 generally comprises a first wall member 15 having a bottom side 15a, a flap member 15d securely and conventionally attached thereto and extending along and outwardly from a first longitudinal edge 15b of the first wall member 15 which is hingedly attached with conventional means along a second longitudinal edge 15c to a first sidewall 30a of a pickup truck box.

The truckbox cover and sidewall extension attachment 10 also includes a second wall member 16 having a bottom side 16a and being hingedly attached with conventional means along a second longitudinal edge 16c to a second sidewall 30b of a pickup truck box. The first and second wall members 15,16 partially overlap a front wall 31 and a tailgate 32 of a truck box when the wall members 15,16 are in a closed position. The flap member 15D is thin and flat and has a width capable of extending partially beneath a first longitudinal edge 16B of the second wall member 16 when both the first and second wall members 15,16 are in a closed position upon a truck box. A means for bracing the first and second wall members 15,16 in upright positions upon respective sidewalls 30A–B of a pickup truck box for essentially extending upwardly the sidewalls 30A–B of a pickup truck box includes a plurality of brackets 20A–D securely and conventionally attached to the first and second wall members 15,16 and to a front wall 31 of a truck box, and further includes a pair of telescoping brace members 25,26 securely and conventionally mounted to the brackets 20A–B, one of the brackets 20A being securely attached to the bottom side 15A of the first wall member 15 and another one of the brackets 20C being securely attached to the bottom side 16A of the second wall member 16. One of the telescoping brace members 25 has an end hingedly connected to the bracket 20A securely attached to the first wall member 15, and the other of the telescoping brace members 26 has an end hingedly connected to the bracket 20C securely attached to the second wall member 16. Each of the telescoping brace members 25,26 includes an air-filled cylinder 25A,26A and a piston 25B,26B movably extended in the cylinder 25A,26A for essentially locking the first and second wall members 15,16 in upright positions upon a truckbox. A lockable latch member 18A is disposed in the second wall member 16 and has a latch portion 18B capable of engaging the flap member 15D to securely lock the two wall members 15,16 upon the box of the pickup truck. When the wall members 15,16 are in a locked position covering the truckbox, a portion of the flap member 15D would be in between the bottom side 16A of the second wall member 16 and the latch portion 18B. In use, the wall members 15,16 not only enclose the cargo area of the truckbox when the wall member 15,16 are closed over the truckbox, but also extend both the sidewalls 30A–B of the truckbox upwardly when the wall members 15,16 are opened and disposed in upright positions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truckbox cover and sidewall extension attachment comprising:

a first wall member having a bottom side, flap member securely attached to said first wall member and extending along and outwardly from a first longitudinal edge of said first wall member, said first wall member being hingedly attached to a first sidewall of a pickup truck box;

a second wall member having a bottom side and being hingedly attached to a second sidewall of a pickup truck box, said first and second wall members partially overlapping a front wall and a tailgate of a truck box wheel said wall members are in a closed position, said flap member being thin and flat and having a width capable of extending partially beneath a first longitudinal edge of said second wall member when both said first and second wall members are in a closed position upon a truck box, a means for bracing said first and second wall members in upright positions upon respective sidewalls of a pickup truck box for essentially extending upwardly the sidewalls of a pickup truck box, and including a plurality of brackets securely attached to said first and second wall members and to a front wall of a truck box, and further including a pair of telescoping brace members securely mounted to said brackets, one of said brackets being securely attached to said bottom side of said first wall member and another one of said brackets being securely attached to said bottom side of said second wall member, one of said telescoping brace members having an end hingedly connected to said bracket which is securely attached to said first wall member, and the other of said telescoping brace members having an end hingedly connected to said bracket which is secretly attached to said second wall member, each of said telescoping brace members including an air-filled cylinder and a piston movably extended in said cylinder for essentially locking said first and second wall members in upright positions upon it truckbox, said means for bracing being positioned near a first end portion of each of the wall members; and a means for lockably latching said first and second walls members together in a closed position, said means for locking being positioned near a second end portion of each of the wall members.

* * * * *